United States Patent
van der Pol et al.

[11] Patent Number: 6,070,474
[45] Date of Patent: Jun. 6, 2000

[54] MASS FLOW METER

[75] Inventors: Roland van der Pol, Venlo, Netherlands; Yousif A. Hussain, Northampton; Chris N. Rolph, Northants, both of United Kingdom

[73] Assignee: Krohne A.G., Basel, Switzerland

[21] Appl. No.: 08/945,101

[22] PCT Filed: Mar. 17, 1997

[86] PCT No.: PCT/EP97/01332

§ 371 Date: May 28, 1998

§ 102(e) Date: May 28, 1998

[87] PCT Pub. No.: WO97/35168

PCT Pub. Date: Sep. 25, 1997

[30] Foreign Application Priority Data

Mar. 17, 1996 [DE] Germany .................. 196 10 332

[51] Int. Cl.[7] ............................................. G01F 1/78
[52] U.S. Cl. ............................................. 73/861.357
[58] Field of Search ................ 73/861.357, 861.355, 73/861.356

[56] References Cited

U.S. PATENT DOCUMENTS

5,691,485 11/1997 Endo et al. .................. 73/861.357
5,796,012 8/1998 Gomi et al. .................. 73/861.357
5,814,739 9/1998 Van Cleve .................. 73/861.357

*Primary Examiner*—Max Noori
*Assistant Examiner*—Jewel V. Thompson

[57] ABSTRACT

A mass flowmeter for flowing media, which operates according to the Coriolis principle, has a preferably cylindrical housing, at least one preferably essentially straight Coriolis measuring tube located within the housing and connected at both of its ends to the housing, a preferably cylindrical bridge located on the Coriolis measuring tube, at least one oscillation generator acting on the Coriolis measuring tube, and at least one sensor detecting Coriolis forces and/or Coriolis oscillations based on Coriolis forces, the bridge being located symmetrically and designed symmetrically with respect to the mid-point of the Coriolis measuring tube, wherein the midpoint of the Coriolis measuring tube is defined with reference to the ends of the Coriolis measuring tube connected to the housing, and the oscillation generator and the sensor being operative between the Coriolis measuring tube and the bridge, The flowmeter is characterized by the fact that the bridge is provided with a balancing system located essentially symmetrically and designed symmetrically with respect to the mid-point of the Coriolis measuring tube.

19 Claims, 6 Drawing Sheets

MASS FLOW METER

The invention concerns a mass flowmeter for flowing media, which operates according to the Coriolis principle, with a preferably cylindrical, in particular circular cylindrical, housing with at least one preferably essentially straight Coriolis measuring tube located within the housing and connected at both of its ends to the housing, with a preferably cylindrical, in particular circular cylindrical, bridge located on the Coriolis measuring tube, with at least one oscillation generator acting on the Coriolis measuring tube, and with at least one sensor detecting Coriolis forces and/or Coriolis oscillations based on Coriolis forces, the bridge being located symmetrically and made symmetrically with respect to the mid-point of the Coriolis measuring tube, wherein the midpoint of the Coriolis measuring tube is defined with reference to the ends of the Coriolis measuring tube connected with the housing, and the oscillation generator and the sensor being operative between the Coriolis measuring tube and the bridge.

BACKGROUND OF THE INVENTION

Mass flowmeters for flowing media, which operate according to the Coriolis principle, are known in different embodiments (cf e.g. German Patent Specification 41 24 295 and German Offenlegungsschrift 41 43 361, and the publication cited there in each case at column 1, lines 20 to 27, German Patent Specification 42 24 397 and the publications cited there at column 1, lines 23 to 30, as well as German Offenlegungsschrift 196 01 342) and are increasingly used in practice.

In the case of mass flowmeters for flowing media which operate according to the Coriolis principle, basically one distinguishes between, on the one hand, those whose Coriolis measuring tube is made at least essentially straight, as a rule exactly straight, and, on the other hand, those whose Coriolis measuring tube is made loop-shaped. In addition, in the case of the mass flowmeters under discussion, one distinguishes between, on the one hand, those which have only one Coriolis measuring tube and, on the other hand, those which have two Coriolis measuring tubes. In the case of the embodiments with two Coriolis measuring tubes, they can be hydraulically in series or parallel to one another.

Mass flowmeters of the type in question, in the case of which the Coriolis measuring tube is, or Coriolis measuring tubes are, made straight, with respect to their mechanical construction simple and can consequently be produced at relatively low cost. In this case also it is possible to finish or polish the inner surfaces of the Coriolis measuring tube or Coriolis measuring tubes well. In addition, they have a relatively low pressure loss. In the case of mass flowmeters which operate according to the Coriolis principle, and in the case of which the Coriolis measuring tube is, or the Coriolis measuring tubes are, made straight, it can be disadvantageous that both thermally caused expansions, or thermally caused stresses, as well as forces and moments acting from outside, can lead to measurement errors and to mechanical damage, namely stress cracks.

The technical world has already dealt with the above-mentioned problems in mass flowmeters with straight Coriolis measuring tubes (cf in particular German Patent Specification 41 24 295, German Offenlegungsschrift 41 43 361, and German Patent Specification 42 24 379). In this case, these problems have largely been solved, on the one hand, by having the Coriolis measuring tube and the bridge connected to one another in a way which excludes axial relative motions, so that the axial separation of the Coriolis measuring tube/bridge connecting points represents the oscillation length of the Coriolis measuring tube and, on the other, by locating the Coriolis measuring tube within the bridge with initial tensile stress (German Patent Specification 41 24 295), and/or having the Coriolis measuring tube and the bridge consist of materials with identical or almost identical coefficients of thermal expansion (German Offenlegungsschrift 41 43 361) and/or providing a length variation sensor determining changes in the oscillation length of the Coriolis measuring tube—for the oscillation length and stress-dependent correction of the measurement value—(German Patent Specification 42 24 379). Altogether, a mass flowmeter operating according to the Coriolis principle, with a straight Coriolis measuring tube, which has an error of measurement of only about 0.1% (cf. the prospectus "Zulassung des Corimass G-Gerätes zum eichpflichtigen Verkehr" of KROHNE Meβtechnik GmbH & Co. KG), was made successfully.

Mass flowmeters operating according to the Coriolis principle, which have only one straight Coriolis measuring tube, have considerable advantages as compared with those mass flowmeters which have either two straight Coriolis measuring tubes or one loop-shaped Coriolis measuring tube. The advantage as compared with mass flowmeters with two straight Coriolis measuring tubes in particular is to be seen in the fact that flow separators or flow combiners, which are required in the case of mass flowmeters with two Coriolis measuring tubes, are not needed. The advantage as compared with flowmeters with one loop-shaped Coriolis measuring tube, or with two loop-shaped Coriolis measuring tubes, in particular, is to be seen in the fact that a straight Coriolis measuring tube is easier to produce than a loop-shaped Coriolis measuring tube, that the pressure drop in the case of a straight Coriolis measuring tube is less than in the case of a loop-shaped Coriolis measuring tube, and that a straight Coriolis measuring tube can be cleaned better than a loop-shaped Coriolis measuring tube.

However, mass flowmeters which operate according to the Coriolis principle and have one straight Coriolis measuring tube, also have a physically or mechanically specified advantage (cf. European Offenlegungsschrift 0 521 439).

Mass flowmeters operating according to the Coriolis principle require that the Coriolis measuring tube, or the Coriolis measuring tubes, be put into oscillation by means of at least one oscillation generator; the Coriolis forces, or the Coriolis oscillations, do indeed result from the fact that the Coriolis measuring tube oscillates, or the Coriolis measuring tubes oscillate, and from the flowing of mass through the Coriolis measuring tube, or through the Coriolis measuring tubes.

In the case of mass flowmeters with two straight Coriolis measuring tubes, or with one loop-shaped Coriolis measuring tube or with two loop-shaped Coriolis measuring tubes, the Coriolis measuring tubes, or the parts of the loop-shaped Coriolis measuring tubes, causing oscillation are designed identically and, as a rule, located and excited into oscillation so that they oscillate opposite one another. This has the positive consequence that the oscillating system as a whole is not acting as such outwards. The position of the center of mass remains constant and forces which appear are compensated. Consequently, no oscillations are introduced into the pipeline system in which this mass flowmeter is installed, and oscillations of the pipeline system do not influence the measurement result.

In the case of mass flowmeters operating according to the Coriolis principle, which have only one straight Coriolis measuring tube, the positive consequence of Coriolis measuring tubes oscillating opposite one another, explained above, does not occur naturally. The center of mass does not remain constant and forces which appear are not compensated. The consequence of this is, on the one hand, that oscillations are transferred to the pipeline system in which a mass flowmeter is installed, and, on the other hand, that oscillations of the pipeline system can influence the measurement result.

In order to solve the above-mention problem, which is characteristic of mass flowmeters with one straight Coriolis tube operating according to the Coriolis principle, the pipeline system in which such a mass flowmeter is installed is frequently additionally clamped. As a rule, in this case, the tube guiding the flowing medium to the mass flowmeter and the tube guiding the flowing medium away from the mass flowmeter are clamped at a distance which corresponds to ten to fifteen times the diameter of the pipe.

In connection with the above-mentioned problem, which is characteristic of mass flowmeters with one straight Coriolis measuring tube operating according to the Coriolis principle, it has already been proposed to provide so-called anti-resonators where the Coriolis measuring tube is clamped, which anti-resonators should have a resonance spectrum of predetermined band width tuned to at least a characteristic oscillation of the Coriolis measuring tube (cf. European Offenlegungsschrift 0 521 439). However, it has been shown that such a measure on the whole cannot lead to an improvement in the case of mass flowmeters which operate very precisely in any event.

Initially, it was mentioned that the mass flowmeter on which the invention is based has a bridge located on the Coriolis measuring tube. Other names, namely "compensation cylinder", (in the German Patent Specification 41 24 295 and in German Offenlegungsschrift 41 43 361), or "supporting tube" (in German Patent Specification 42 24 379) are used for this bridge in the prior art. What is designated here as a bridge is what is designated otherwise as a "compensation cylinder" or "supporting tube". The more general expression "bridge" has been used here because in the case of this component, it does not have to be a matter of a cylinder or a tube. The interaction of Coriolis measuring tube and bridge is essential only to the effect that the axial separation of the Coriolis measuring tube/bridge connecting point specifies the functionally necessarily excited area of the Coriolis measuring tube, and the symmetrical arrangement and symmetrical design of the bridge with respect to the midpoint of the Coriolis measuring tube, wherein the midpoint of the measuring tube is defined with reference to the ends of the Coriolis measuring tube connected to the housing.

Also, it was mentioned initially that the mass flowmeter on which the invention is based has at least one oscillation generator acting on the Coriolis measuring tube and at least one sensor detecting Coriolis forces and/or Coriolis oscillations based on Coriolis forces and that the oscillation generator and the sensor "are operative between the Coriolis measuring tube and the bridge". This means that the Coriolis measuring tube is excited to oscillations with respect to the bridge and that Coriolis forces or Coriolis oscillations appearing between the Coriolis measuring tube and the bridge are detected by the sensor or, as a rule, by two sensors.

SUMMARY OF THE INVENTION

The object of the invention here is to improve the known mass flowmeter operating according to the Coriolis principle, on which the invention is based, with respect to the problem explained in detail, which results from the fact that the mass flowmeter has only one straight Coriolis measuring tube.

The mass flowmeter in accordance with the invention, in the case of which the object derived and presented previously in detail is solved, is now characterized in the first place and essentially by the fact that the bridge is provided with a balancing system located essentially symmetrically and designed symmetrically with respect to the mid point. Preferably, the balancing system itself is a system capable of oscillation, consisting of a balancing mass and of a balancing spring. The design in accordance with the invention, as explained initially, in connection with a mass flowmeter with one measuring tube made straight is particularly advantageous. In addition, the desired oscillation insulation in accordance with the invention by means of the arrangement of a balancing system also is preferably used in connection with one curved measuring tube or several straight or curved measuring tubes, the center of mass of which is not at rest without the arrangement of a balancing system.

The teaching of the invention should ensure that in the case of the mass flowmeter in accordance with the invention, although the flowmeter only has one straight Coriolis measuring tube, the oscillating system as a whole is almost not or not at all acting as such outward. Consequently, the goal is to design the balancing system so that the oscillation amplitude of the bridge is very small, preferably approaching zero. The expert can find the corresponding design of the balancing system empirically. However, he can also—or in the case of the empirical design—consider that the following equation obtains in a first approximation:

$$\frac{X_1 K_1}{F_0} = \frac{\left[1-\left(\frac{W}{W_{22}}\right)^2\right]}{\left[1+\frac{K_2}{K_1}-\left(\frac{W}{W_{11}}\right)^2\right]\left[1-\left(\frac{W}{W_{22}}\right)^2\right]-\frac{K_2}{K_1}}$$

in which:
$X_1$=oscillation amplitude of the bridge,
$K_1$=spring rigidity of the bridge,
$K_2$=spring rigidity of the balancing system,
W=characteristic frequency of the Coriolis measuring tube,
$W_{11}$=characteristic frequency of the bridge,
$W_{22}$=characteristic frequency of the balancing system, and
$F_0$=force with which the Coriolis measurement tube is excited.

The parameters indicated previously preferably altogether are to be used so that the characteristic frequency, i.e., the Eigenfrequency, of the balancing system in the direction of oscillation parallel to the Coriolis measuring tube corresponds to the characteristic frequency of the Coriolis measuring tube. However, the characteristic frequency of the balancing system can also be chosen so that it corresponds to x-times or 1/x-times the characteristic frequency of the Coriolis measuring tube, x being an integer.

Arranging the symmetrically designed balancing system symmetrical to the mid-point of the Coriolis measuring tube with reference to the ends of the Coriolis measuring tube connected to the housing ensures that the balancing system spreads only minimal torsional oscillations around this midpoint of the Coriolis line into the bridge. It is especially important to prevent these couplings since such oscillations of the bridge around this mid-point strongly couple to the anti-symmetrical oscillations of the Coriolis measuring tube in the Coriolis mode. Therefore, the above-mentioned coupling is relatively strong and has correspondingly great influence on the measurement accuracy, since an oscillation around the mid-point of the Coriolis measuring tube is also anti-symmetric, as is the oscillation in the Coriolis mode in the case of a Coriolis measuring tube excited in the basic oscillation.

In addition to locating the balancing system essentially at the mid-point of the Coriolis measuring tube, with reference to the ends of the Coriolis measuring tube connected to the housing, the tendency of the bridge to an oscillation around this mid-point is reduced further in such a way that the characteristic frequency of the balancing system in the oscillation directions perpendicular to the direction of oscillation of the Coriolis measuring tube—in particular in the direction of the connecting line between the connecting points of the ends of the Coriolis measuring tube to the housing—corresponds to a frequency clearly deviating from the characteristic frequency of the Coriolis measuring tube and whole-number multiples of fractions thereof. This measure ensures that the balancing system is not excited to oscillations perpendicular to the direction of oscillation of the Coriolis measuring tube, which again would lead to oscillations of the bridge around the mid-point, and that possibly existing oscillations of the balancing system in oscillation directions perpendicular to the direction of oscillation of the Coriolis measuring tube cannot couple to the oscillation in the Coriolis mode, so that as a result the measurement accuracy is clearly increased.

The mass flowmeter in accordance with the invention further undergoes a supplementary measure for improving the measurement accuracy because of the fact that the balancing system is adjustable along the connecting line between the connecting points between the Coriolis measuring tube/housing. This adjustment ensures that the balancing system is always located at the center of mass of the Coriolis measuring tube and bridge assembly. This adjustment is necessary since, because of manufacturing tolerances, the center of mass of the Coriolis measuring tube and the housing assembly does not always lie at the mid-point of the Coriolis measuring tube between the ends of the Coriolis measuring tube connected to the housing. A corresponding adjustment precisely to the center of mass again reduces the possibility of the coupling of torsional oscillations around the center of mass to the oscillation of the Coriolis measuring tube.

In particular, there are now a number of possibilities for designing and further developing the mass flowmeter in accordance with the invention. We refer here, on the one hand, to the patent claims subordinate to Patent claim 1 and on the other hand, to the description of preferred embodiments in connection with the drawings.

DESCRIPTION OF THE PREFERRED EMBODIMENTS

The mass flowmeter for flowing media in accordance with the invention is one which operates according to the Coriolis principle. The mass flowmeter in accordance with the invention includes a housing 1—which is cylindrical in the embodiments shown, a straight Coriolis measuring tube 2 located within the housing 1 and connected at its two ends to the housing 1, a bridge 3—which is cylindrical in the embodiments shown—located on the Coriolis measuring tube 2, as well as, at least one oscillation generator G acting upon the Coriolis measuring tube 2 and at least one sensors detecting Coriolis forces, the generator G and sensor(s) S being depicted in FIG. 1 and/or Coriolis oscillations based on Coriolis forces.

Figure 1:
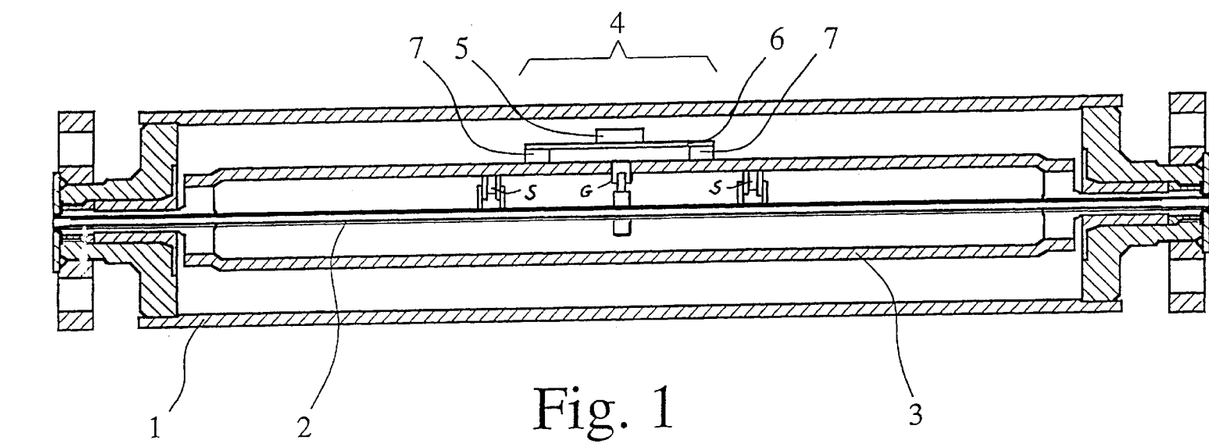
FIG. 1 shows a longitudinal section through a first embodiment of a mass flowmeter in accordance with the invention.
Figure 2:
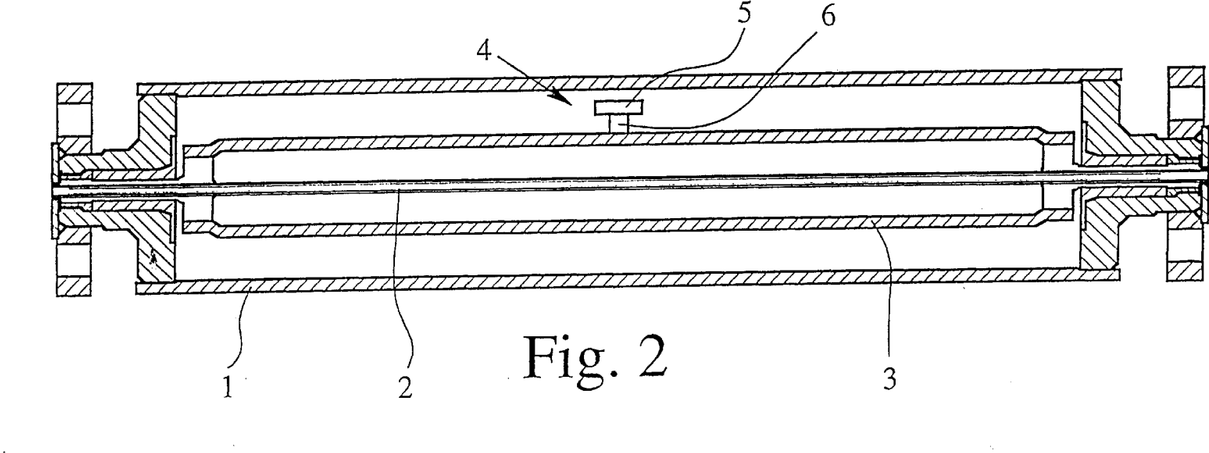
FIG. 2 shows a longitudinal section, corresponding to FIG. 1, through a second embodiment of a mass flowmeter in accordance with the invention.
Figure 3:
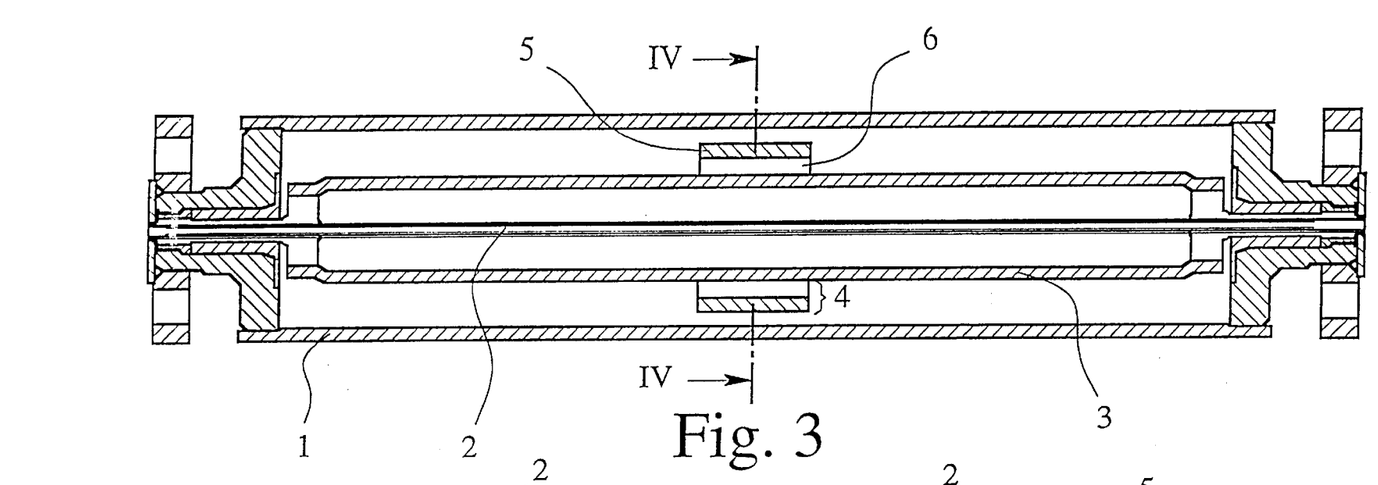
FIG. 3 shows a longitudinal section, corresponding to FIG. 1, through a third embodiment of a mass flowmeter in accordance with the invention.

As indicated in FIGS. 1 to 3, the Coriolis measuring tube 2 and the bridge 3 are connected with one another in a way excluding axial relative motions; the axial separation of the Coriolis measuring tube 2/bridge 3 connecting points here represents the oscillation length of the Coriolis measuring tube 2. The bridge 3 is located symmetrically and designed symmetrically with reference to the ends of the Coriolis measuring tube connected to the housing.

The oscillation generator and the sensor, or the sensors, are operative between the Coriolis measuring tube 2 and the bridge 3. FIG. 1 of German Patent Specification 41 24 295, respectively German Offenlegungsschrift 41 43 361, as well as FIGS. 1, 2, 3 and 5 of German Patent Specification 42 24 379, show in detail how the oscillation generator and sensor components can be arranged.

In the case of the mass flowmeters in accordance with the invention under consideration, the bridge 3 is provided with L balancing system 4 located symmetrically and designed symmetrically with respect to the mid-point of the Coriolis measuring tube. The balancing system 4 is a system capable of oscillation, namely it consists of a balancing mass 5 and a balancing spring 6 and is designed so that the oscillation amplitude of the bridge 3 is very small, preferably approaching zero.

In the embodiments in accordance with FIGS. 1 and 2, the balancing 4 is provided only on one side of the bridge 3. FIG. 1 shows with respect to the balancing system 4 that the balancing spring 6 is made as a leaf spring. In this case, the balancing spring 6 made as a leaf spring is connected with the bridge 3 via spacer 7, and the balancing mass 5 is located on the balancing on spring 6. As compared with this, in the embodiment in accordance with FIG. 2, the balancing spring 6 is made as a coil spring.

Figure 4:
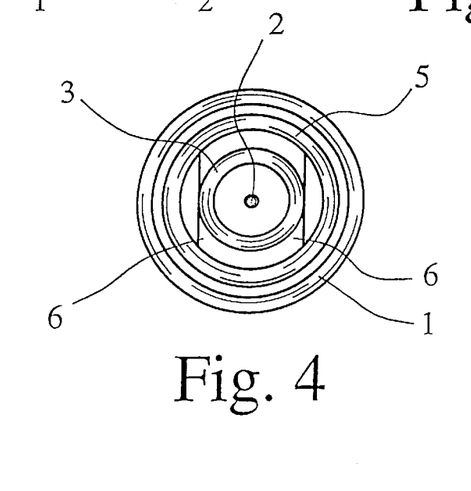
FIG. 4 shows a cross-section through the embodiment, shown in FIG. 3, of a mass flowmeter in accordance with the invention, along the line IV—IV.
Figure 5:
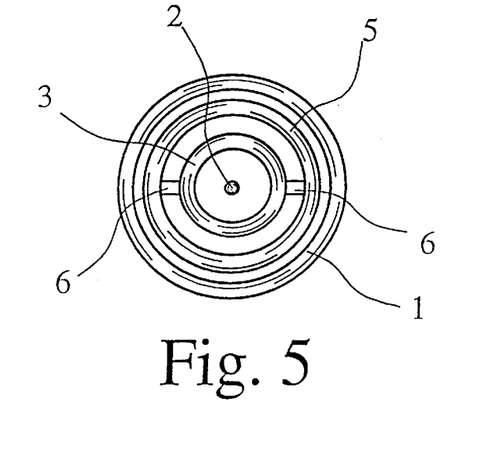
FIG. 5 shows a cross-section through a further embodiment of a mass flowmeter in accordance with the invention, not otherwise shown.

While in the case of the embodiments in accordance with FIGS. 1 and 2, the balancing spring 4 is provided on one side of the bridge 3, for the embodiments in accordance with FIGS. 3 to 5 it is the case that the balancing mass 5 of the balancing system 4 surrounds the circular cylindrical bridge 3 concentrically. In this case, it is to be noted for the embodiment in accordance with FIGS. 3 and 4 that the balancing mass 5 surrounding the bridge 3 is concentrically connected with the bridge 3 via two balancing springs 6 made as leaf springs, while two balancing springs 6 made as coil springs are provided between the balancing mass 5 and the bridge 3 in the embodiment in accordance with FIG. 5. Since the oscillation of the Coriolis measuring tube 2 regularly takes place only in one plane, it can be advantageous to make the balancing mass surrounding bridge 3 slightly eccentric.

Figure 6:
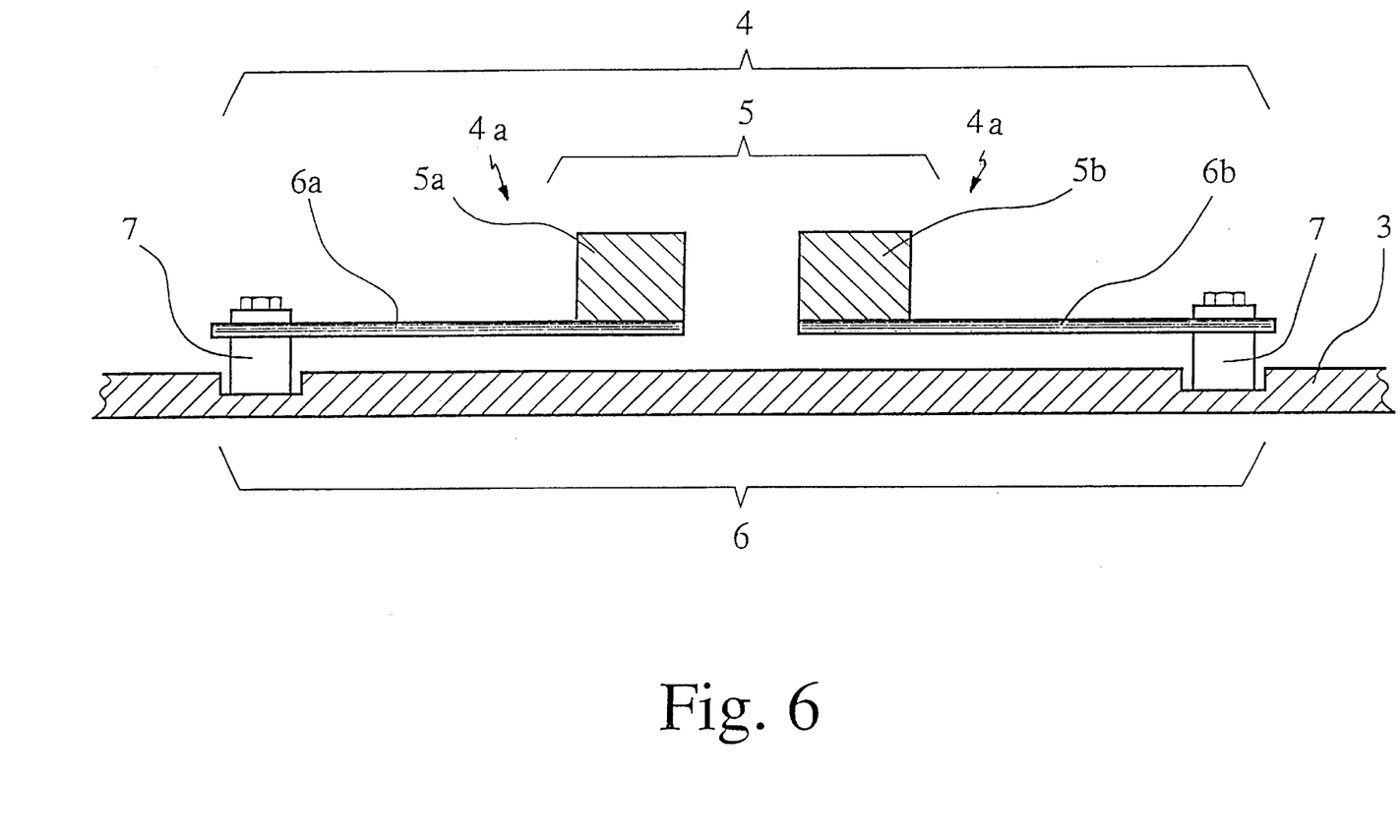
FIG. 6 shows a part of a bridge belonging to a mass flowmeter in accordance with the invention with a first embodiment of a specially designed balancing system, in a representation which is larger than that of FIGS. 1 to 5.

Further, FIG. 6 shows a special design of the balancing system 4 belonging to the mass flowmeter in accordance with the invention. In this case, the balancing system 4 consists of two partial systems 4a, 4b, the balancing mass 5 consisting of two individual masses 5a, 5b, and the balancing spring 6 consisting of two individual springs 6a, 6b and in each case, an individual mass 5a, 5b, respectively, being provided on an individual spring 6a, 6b, respectively. The two partial systems 4a, 4b of the balancing system 4 are located at a distance from one another.

Figure 7:
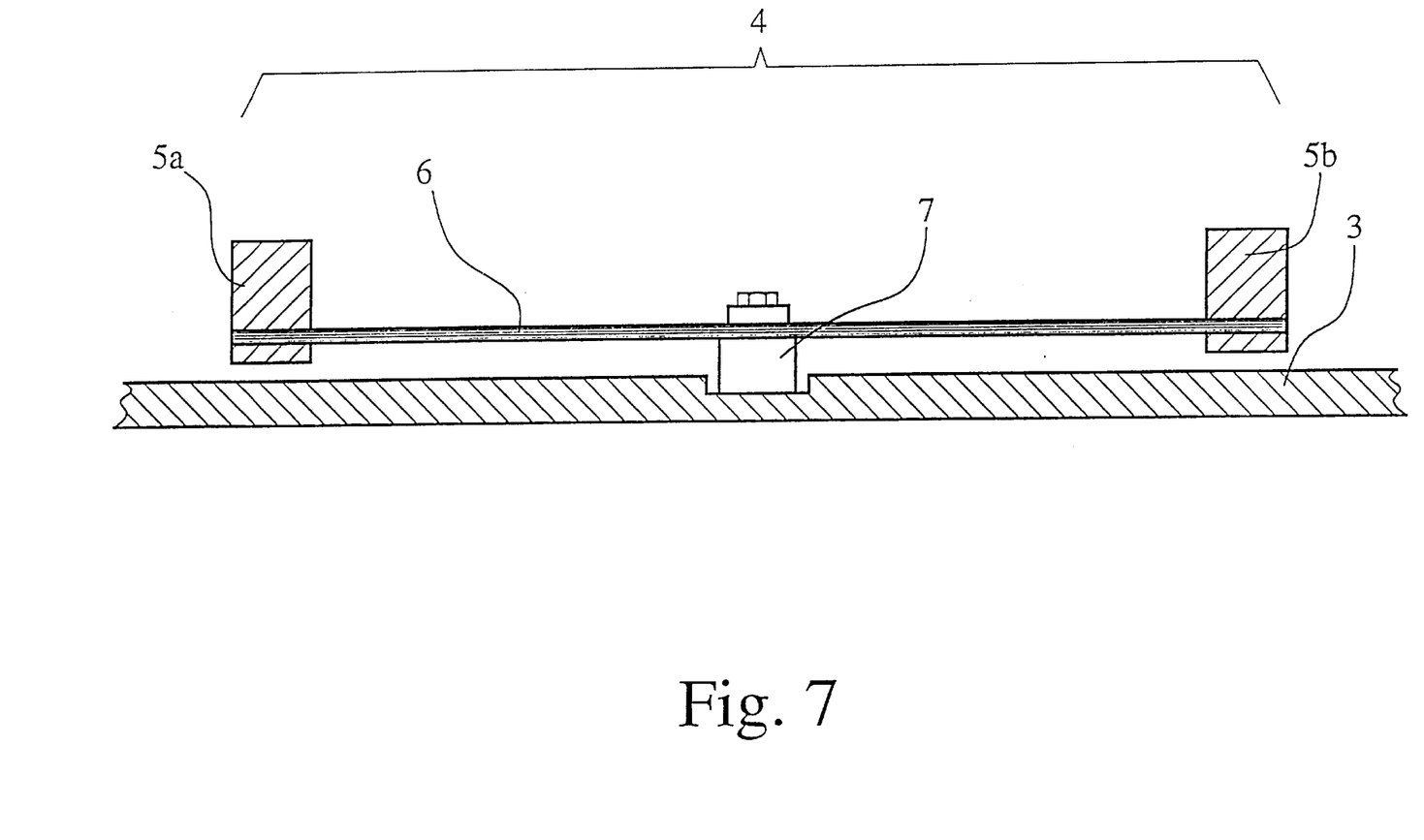
FIG. 7 shows a part of a bridge belonging to a mass flowmeter in accordance with the invention with a second embodiment of a specially designed balancing system, in a representation which is larger than that of FIGS. 1 to 5.

FIG. 7 shows an alternative to the design of the balancing system 4 belonging to the mass flowmeter in accordance with the embodiment shown in FIG. 6. In the case of this second embodiment of a specially designed balancing system, the balancing spring 6 is made in one piece, connected with the bridge 3 via a spacer 7, and provided on both ends of the balancing spring 6 turned away from the spacer 7 with an individual mass 5a or 5b.

In the case of the embodiments of a specially designed balancing system 4 shown in FIGS. 6 and 7, it is possible to change the characteristic frequency, i.e., the Eigenfrequency, of this balancing system 4 and to adapt the characteristic frequency of the Coriolis measuring tube so that the individual masses 5a and 5b can be pushed along the respective springs 6, 6a, 6b. Therefore, this is particularly advantageous since the Coriolis measuring tubes of two identical mass flowmeters as a rule have different characteristic frequencies because of manufacturing tolerances.

Figure 8:
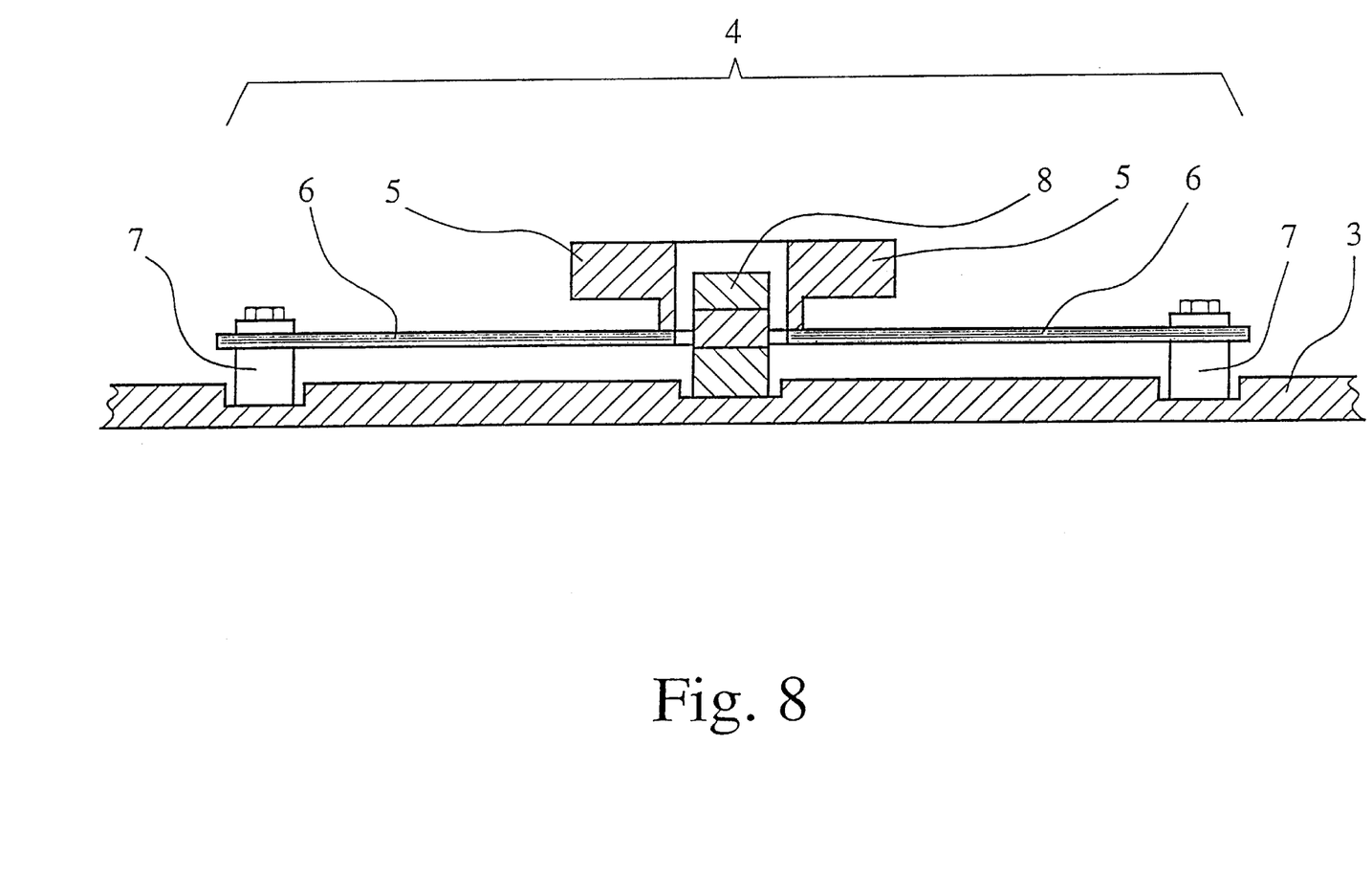
FIG. 8 shows a part of a bridge belonging to a mass flowmeter in accordance with the invention with a third embodiment of a specially designed balancing system, in a representation which is larger than that or FIGS. 1 to 5, and FIG. 9. Shows the third embodiment of a specially designed balancing system in a top view.
Figure 9:
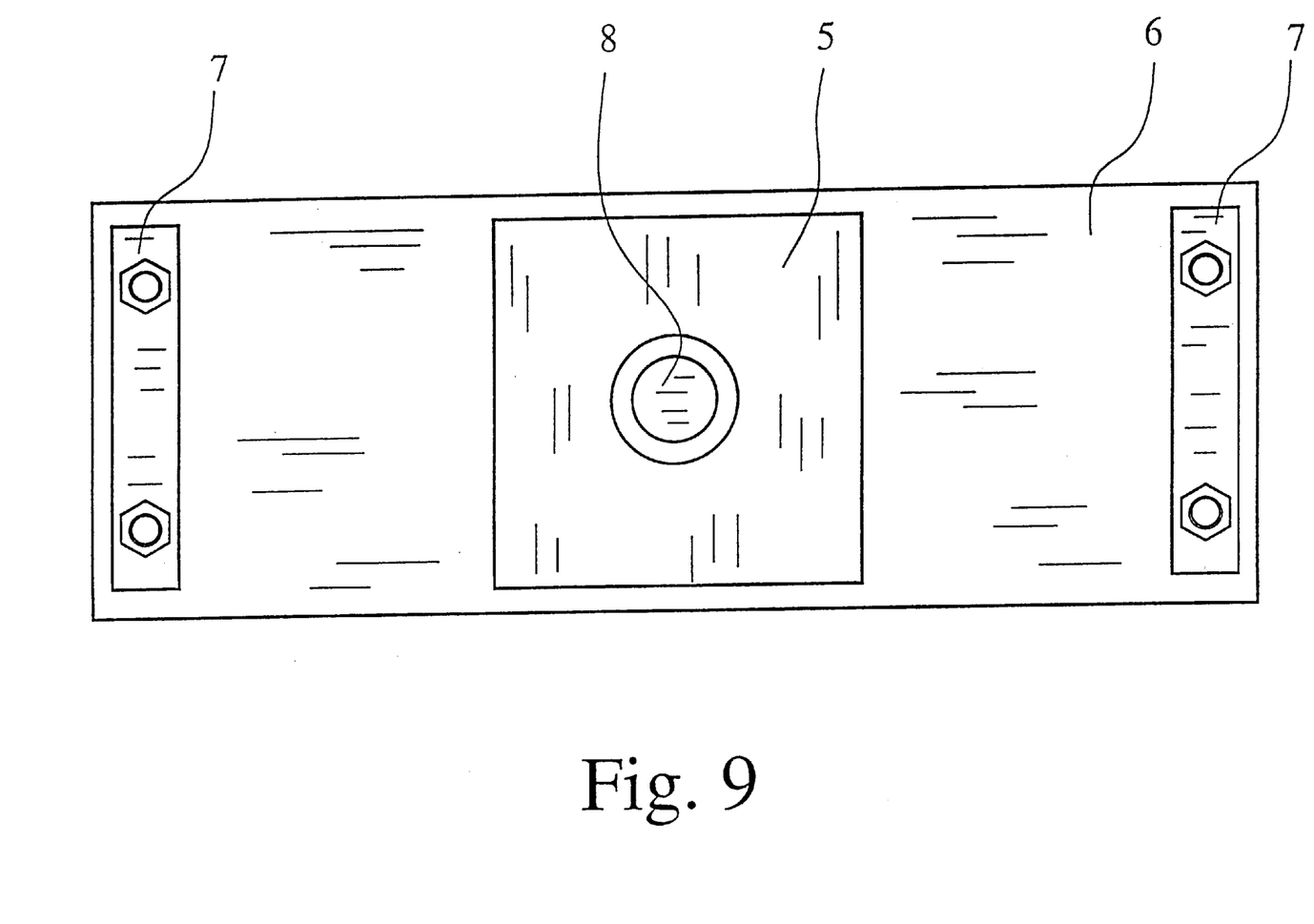

The third embodiment of a specially designed balancing system 4 shown in FIGS. 8 and 9 has a leaf spring 6, a central balancing mass 5, and several spacers 7 for fastening the leaf spring 6 to the bridge 3. As is evident from FIGS. 8 and 9, the balancing mass 5 and, correspondingly, the balancing spring 6 have a central recess into which a magnet 8 projects. This magnet 8 causes the oscillation of the balancing system 4 to be damped, assuming that the balancing mass 5 and/or the leaf spring 6 consists of an electrically conducting material. This damping causes a change in the characteristic frequency of the balancing system 4. If the magnet 8 is made as a permanent magnet, the damping and thus the shifting of the characteristic frequency is constant and, for example, can be used for balancing of manufacturing tolerances in the characteristic frequency of the Coriolis measuring tube 2. As an alternative to being made as a permanent magnet, the magnet 8 also can be made as an electromagnet. In the case of such a design, there is the possibility of varying the damping of the balancing system 4 during the operation of the mass flowmeter and consequently varying the characteristic frequency of the balancing system 4 to possibly adapt it to the characteristic frequency of the Coriolis measuring tube 2, which changes constantly during the operation of the mass flowmeter, for example depending on the density and the temperature of the flowing medium.

We claim:

1. A mass flowmeter for flowing media, which operates according to the Coriolis principle, with a preferably cylindrical, in particular circular cylindrical, housing, with at least one preferably essentially straight Coriolis measuring tube located within the housing and connected at both of its ends to the housing, with a preferably cylindrical, in particular circular cylindrical, bridge located on the Coriolis measuring tube, with at least one oscillation generator acting on the Coriolis measuring tube, and with at least one sensor detecting Coriolis forces and/or Coriolis oscillations based on Coriolis forces, the bridge being symmetric with respect to the mid-point of the Coriolis measuring tube, wherein the midpoint of the Coriolis measuring tube is defined with reference to the ends of the Coriolis measuring tube connected to the housing, and the oscillation generator and the sensor being operative between the Coriolis measuring tube and the bridge, characterized by the fact that the bridge (3) is provided with a balancing system (4) which is symmetric with respect to the mid-point and consists of a balancing mass (5) and a balancing spring (6) capable of oscillation with respect to the bridge (3).

2. The mass flowmeter in accordance with claim 1, characterized by the fact that the balancing system (4) is designed so that the oscillation amplitude of the bridge (3) is very small, preferably approaching zero.

3. The mass flowmeter in accordance with claim 2 or 3, characterized by the fact that the characteristic frequency of the balancing system (4) in the oscillation direction parallel to the oscillation direction of the Coriolis measuring tube (2) corresponds to the characteristic frequency of the Coriolis measuring tube (2).

4. The mass flowmeter in accordance with claim 2 or 3, characterized by the fact that the characteristic frequency of the balancing system (4) in the oscillation direction parallel to the oscillation direction of the Coriolis measuring tube (2) corresponds to x-times the characteristic frequency or 1/x times the characteristic frequency of the Coriolis measuring tube (2), x being an integer.

5. The mass flowmeter in accordance with any on of claims 1 to 3, characterized by the fact that the characteristic frequency of the balancing system in the oscillation direction perpendicular to the oscillation direction of the Coriolis measuring tube (2) corresponds to a frequency clearly deviating from x-times the characteristic frequency or 1/x times the characteristic frequency of the Coriolis measuring tube (2), x being an integer.

6. The mass flowmeter in accordance with any one of claims 1 to 3, characterized by the fact that the balancing system (4) is adjustable along the connecting line between the connecting points between the Coriolis measuring tube (2) and the housing (1).

7. The mass flowmeter in accordance with any on of claims 1 to 3, characterized by the fact that the balancing system (4) is provided on one side of the bridge (3).

8. The mass flowmeter in accordance with any one of claims 1 to 3, characterized by the fact that the balancing spring (6) of the balancing system (4) is made as a leaf spring.

9. The mass flowmeter in accordance with claim 8, characterized by the fact that the balancing spring (6) made as a leaf spring is connected via a spacer (7) with the bridge (3) and at least one balancing mass (5) is located on the balancing spring (6).

10. The mass flowmeter in accordance with claim 9, characterized by the fact that the balancing mass (5) is moveable along the balancing spring (6).

11. The mass flowmeter in accordance with any one of claims 1 to 2, characterized by the fact that the balancing spring (6) is made as a coil spring.

12. A mass flowmeter in accordance with any one of the claims 1 to 2, characterized by the fact that the balancing mass (5) of the balancing system (4) surrounds the bridge (3) concentrically.

13. The mass flowmeter in accordance with claim 12, characterized by the fact that the balancing mass (5) concentrically surrounding the bridge (3) is connected with bridge (3) via a least one balancing spring (6) made as a leaf spring.

14. The mass flowmeter in accordance with claim 12, characterized by the fact that the balancing mass (5) concentrically surrounding the bridge (3) is connected with the bridge (3) via at least one balancing spring (6) made as a coil spring.

15. The mass flowmeter in accordance with any one of the claims 1 to 3, characterized by the fact that the balancing system (4) consists of two partial systems (4a, 4b), namely the balancing mass (5) consists of two individual masses (5a, 5b) and the balancing spring (6) consists of two individual springs (6a, 6b) and in each case an individual mass (5a, 5b, respectively) is provided in each case on an individual spring (6a, 6b, respectively).

16. The mass flowmeter in accordance with claim 15, characterized by the fact that the two partial systems (4a, 4b) of the balancing system (4) are located at a distance from one another.

17. The mass flowmeter in accordance with any one of the claims 1 to 3, characterized by the fact that the balancing system (4) has a balancing spring (6) and two individual masses (5a, 5b) attached to the balancing spring (6).

18. The mass flowmeter in accordance with any one of claims 2 or 3, characterized by the fact that a magnet (8) interacting with the balancing mass (5) and/or the balancing spring (6) is located on the measuring bridge (3).

19. The mass flowmeter in accordance with claim 18, characterized by the fact that the magnet (8) is made as a permanent magnet or, an electromagnet.

* * * * *